Patented Sept. 27, 1932

1,879,162

UNITED STATES PATENT OFFICE

FELIX M. FREDERIKSEN, OF MILWAUKEE, WISCONSIN, ASSIGNOR TO PABST CORPORATION, OF MILWAUKEE, WISCONSIN, A CORPORATION OF WISCONSIN

PROCESS FOR THE MANUFACTURE OF SOFT CHEESE

No Drawing.    Application filed June 17, 1931. Serial No. 545,149.

The invention relates to the manufacture of a soft cheese of the cream cheese type.

A soft cream cheese of new properties may be made according to this invention. The cheese produced has a new texture or consistency ranging from a soft and at the same time short texture which, however, gives no feeling of sandiness or roughness on the tongue, to a smooth, creamy, buttery texture. Any consistency within the above range can be predetermined and produced with great exactness. The cheese produced also has a new, clean, attractive flavor. Sweetness in the flavor may be adjusted according to this invention to any desired amount through complete control of the milk sugar content of the product. The product of this invention has superior keeping qualities and may be produced centrally in quantity and widely distributed at reasonable cost and without danger of spoiling. The cheese of this invention can be produced from wholesome and nutritious materials which are at the same time not excessively costly. The process of this invention is simple and direct and one which can be completed in a relatively short time.

The manufacture of a soft cheese having all of the above characteristics, it is believed, prior to this invention has never been accomplished. This is true in spite of the many efforts made in the past to make a completely satisfactory product of this type.

The manufacture of cheese of this type has been carried on according to the Neufchatel process. The Neufchatel process may be classed as a very sensitive process. That is to say that from day to day uniform results can be obtained only with the most skillful operation. The flavor, texture and keeping qualities of the Neufchatel product at times are excellent, but more frequently the product is faulty in keeping quality, flavor and texture. There is little or no opportunity to correct the product and the process is, in addition, a laborious one.

More recently a cheese of this type has been made according to the process described in Patent No. 1,661,601, to Arthur C. Dahlberg. This process can be controlled to produce a uniform product from day to day. The process is simple and economical. The process is adapted to produce, however, only one single type of product. This product contains a large proportion of casein, butterfat, some acid and an appreciable quantity of milk sugar. Due to the natural properties of casein the product has a gummy, plastic, buttery texture which is very characteristic and the flavor of the product is sweet, due to the high milk sugar content. The flavor is attractive but sweet-sour rather than of a clean, acid taste and the product is limited in popularity and usefulness due to its characteristic texture and excessively sweet flavor.

The process of this invention, on the other hand, produces a cheese of the smooth, attractive shortness characteristic of paracasein and at the same time having a clean, acid flavor, free of over sweetness due to excessive milk sugar content. The cheese is smooth without being buttery and sticky. It fractures with a clean break rather than the indefinite cleavage characteristic of pastiness.

The departure of the process of this invention from other processes lies in choosing ingredients and methods of compounding which permit complete control of the milk sugar content together with the form of the casein. Other processes starting with milk, cream, milk powder and the like are confined as a minimum to the natural and appreciable milk sugar content of these materials. In such processes as the Dahlberg process the milk sugar content cannot be controlled independently of the casein content. The conversion of the casein content of the Dahlberg product to paracasein has been attempted without successful results. Conversion has been obtained but with such detrimental effect upon the product that the product is of very little use. In the process of this invention, wherein young cheese or other proper casein product, butterfat and water are employed, the milk sugar content can be very low because these ingredients contain only minute amounts of the material. By employing young cheese or proper casein product as an ingredient, a substantial proportion of paracasein is obtained. In a cheese such as American cheese the casein has been acted upon by rennet enzyme and converted to paracasein.

The following process is an example of one method of practicing the invention. American cheese approximately one week from the press is comminuted and emulsified with an emulsifier such as tri-sodium phosphate and water by methods well known in the art of manufacturing process cheese. The amount of water used is governed by the moisture content desired in the finished product. To this emulsified cheese is added sweet butter to an approximate proportion of three parts by weight of sweet butter to one part by weight of the original cheese. Approximately one-half of one per cent. (0.5%) by weight of common salt and one-half of one per cent. (0.5%) by weight of milk sugar are added and the mixture is pasteurized by heating, with stirring, to 180 degrees F. The mixture is then cooled to 110 degrees F. and one-half to two per cent. (0.5 to 2.0%) by weight of good commercial starter added. The mixture is then passed through a coarse strainer and then homogenized. The homogenization produces a creamy consistency in the mixture. As the material comes from the homogenizer it can be poured at once into the final container or into larger containers for subsequent subdivision. In either case the material is cooled to approximately seventy degrees F. and held at this temperature for from ten to twenty hours or longer until sufficient acid is developed to produce a mild acid flavor. With the development of acidity the mixture acquires a moderately firm body, such as is desired in this type of cheese. The cheese can be consumed immediately upon the completion of the above steps or can be stored for extended periods if the temperature is maintained between thirty-two and forty degrees F. The cheese made as directed above may be held for two weeks or longer at a temperature of seventy degrees F. without appreciable deterioration in flavor but such practice is not to be recommended and is merely cited as an indication of the excellent keeping qualities of the product.

This invention may be practiced in several different ways. For example, in the place of young American cheese, rennet casein, cottage cheese and other materials containing paracasein in considerable quantities may be used. In place of sweet butter, heavy cream or butter oil or related materials may be used as a source of butterfat. The addition of salt and milk sugar may also be varied or omitted and other flavoring material and condiments added. In any case the steps of the invention will be practiced in a manner similar to the process outlined above with minor alterations, such as the order of addition of salt, butterfat, etc. The homogenization might also be accomplished in two steps, treating the material both before and after the butterfat is added or before or after the starter is added. The order of the steps, however, should not be so altered that the pasteurization takes place after the starter is added.

The process of this invention may also be employed to produce a product low in milk sugar and not necessarily containing a large proportion of paracasein. In such case the milk product from which milk sugar has been substantially freed and containing principally casein can be used in place of the young cheese above mentioned. The invention is practiced in this form where a different texture is wanted and where the good flavor made possible by this invention is desired.

The term "cheese substance" is herein intended to designate any casein containing derivative of milk which is substantially free of milk sugar. The casein content of cheese substances can be in the form of normal casein, paracasein or a mixture of the two.

The process of this invention has been carefully and completely described and detailed directions given for the practice of it in one specific form. It is intended that protection of Letters Patent be given not only to the specific form described but to the full spirit of the invention as represented by the appended claims.

What I claim as my invention is:

1. The process of manufacturing a soft cream cheese which consists in emulsifying a cheese substance substantially free of milk sugar, mixing therewith butterfat substance in weight approximately three times the original weight of the cheese substance, adding a small amount of milk sugar, pasteurizing the mixture by heating and stirring, cooling the mixture, adding starter, passing the mixture through an homogenizer, and maintaining the mixture at acid developing temperature until acid flavor is produced.

2. A process for the manufacture of a soft cream cheese which consists in mixing an emulsifier and water with a cheese substance containing substantial amounts of paracasein, emulsifying the same, adding sweet butter in amount approximately three times the weight of the original cheese substance, adding approximately 0.5 per cent. of common salt and 0.5 per cent. of milk sugar, pasteurizing the mixture, cooling the mixture to about one hundred and ten degrees F., adding from 0.5 to 2.0 per cent. of commercial starter, passing the material through a homogenizer, and maintaining the mixture at approximately seventy degrees F. for a period in excess of ten hours.

3. A process for the manufacture of a soft cream cheese which consists in mixing an emulsifier and water with American cheese about one week from the press, emulsifying the same, adding sweet butter in amount approximately three times the weight of the original cheese substance, adding approximately 0.5 per cent. of common salt and 0.5 per cent. of milk sugar, pasteurizing the mixture and stirring, cooling the mixture below about one hundred and ten degrees F., adding approximately 0.5 to 2.0 per cent. of good commercial starter, passing the material through a homogenizer, and maintaining the mixture at approximately seventy degrees F. until a satisfactory acid flavor is obtained.

In testimony whereof, I affix my signature.

FELIX M. FREDERIKSEN.